United States Patent [19]

Hiebert et al.

[11] Patent Number: 5,707,946
[45] Date of Patent: Jan. 13, 1998

[54] POUR POINT DEPRESSANTS AND THEIR USE

[75] Inventors: Gregory L. Hiebert, Mentor; Marvin B. DeTar, Wickliffe, both of Ohio

[73] Assignee: The Lubrizol Corporation, Wickliffe, Ohio

[21] Appl. No.: 629,311

[22] Filed: Apr. 8, 1996

Related U.S. Application Data

[60] Provisional application No. 60/003,482.

[51] Int. Cl.⁶ .................................................. C10M 129/10
[52] U.S. Cl. .................................................. 508/585
[58] Field of Search ........................... 508/575, 584, 508/585

[56] References Cited

U.S. PATENT DOCUMENTS

| | | | |
|---|---|---|---|
| 2,412,589 | 12/1946 | Lieber | 508/575 |
| 3,962,124 | 6/1976 | Motz et al. | 508/575 |
| 4,273,891 | 6/1981 | Pindar et al. | 508/575 |
| 5,118,875 | 6/1992 | Martella et al. | 508/575 |

FOREIGN PATENT DOCUMENTS 1173975  12/1969  United Kingdom.

OTHER PUBLICATIONS

"Polymer additives for engine oils", *Chemtech*, M.K. Mishra et al, Apr., 1995 p. 40.

"Chemical Structure of Alkyl Phenols and their Effectiveness as Depressants", P.I. sanin et al; Trudy Inst. Fefti, Akad. Nauk S.S.S.R., 8, pp. 180–184, 1956, month unavailable.

*Primary Examiner*—Jacqueline V. Howard
*Attorney, Agent, or Firm*—Frederick D. Hunter; David M. Shold

[57] ABSTRACT

The pour point of paraffin-containing liquids is reduced by adding to the liquid an effective amount of a pour point depressant which is the reaction product of a hydrocarbyl-substituted phenol having a number average of greater than 30 carbon atoms in the hydrocarbyl-substituent, and an aldehyde of 1 to about 12 carbon atoms, or a source therefor. The pour point depressant is particularly useful for treating crude oils which have an initial pour point of 4° C. or higher.

39 Claims, No Drawings

POUR POINT DEPRESSANTS AND THEIR USE

This application claims the benefit of U.S. Provisional Application: application Ser. No. 60/003,482, filed Sep. 8, 1995.

BACKGROUND OF THE INVENTION

The present invention relates to materials useful for lowering the pour point of wax-containing liquid hydrocarbons, and compositions of and methods for preparing the same.

Various types of distillate fuel oils such as diesel fuels, various oils of lubricating viscosity, automatic transmission fluids, hydraulic oil, home heating oils, and crude oils and fractions thereof require the use of pour point depressant additives in order to allow them to flow freely at lower temperatures. Often kerosene is included in such oils as a solvent for the wax, particularly that present in distillate fuel oils. However, demands for kerosene for use in jet fuel has caused the amount of kerosene present in distillate fuel oils to be decreased over the years. This, in turn, has required the addition of wax crystal modifiers to make up for the lack of kerosene. Moreover, the requirement for pour point depressant additives in crude oils can be even more important, since addition of kerosene is not considered to be economically desirable.

U.S. Pat. No. 5,039,437, Martella et al., Aug. 13, 1991, (and U.S. Pat. No. 5,082,470, Martella et al., Jan. 21, 1992, a division thereof) disclose alkyl phenol-formaldehyde condensates additives for improving the low temperature flow properties of hydrocarbon oils. The polymer composition has a number average molecular weight of at least about 3,000 and a molecular weight distribution of at least about 1.5; in the alkylated phenol reactant the alkyl groups are essentially linear, have between 6 and 50 carbon atoms, and have an average number of carbon atoms between about 12 and 26; and not more than about 10 mole % of the alkyl groups on the alkylated phenol have less than 12 carbon atoms and not more than about 10 mole % of the alkyl groups on the alkylated phenol have more than 26 carbon atoms.

U.S. Pat. No. 4,565,460, Dorer, Jr., et al., Jan. 14, 1986, (and U.S. Pat. Nos. 4,559,155, Dec. 17, 1985, 4,565,550, Jan. 21, 1986, 4,575,526, Mar. 11, 1986, and 4,613,342, Sep. 23, 1986, divisions thereof), disclose additive combinations for improving the cold flow properties of hydrocarbon fuel compositions. The composition includes a pour point depressant which can be a hydrocarbyl-substituted phenol of the formula $(R^*)_a$—Ar—$(OH)_b$ wherein $R^*$ is a hydrocarbyl group selected from the group consisting of hydrocarbyl groups of from about 8 to about 39 carbon atoms and polymers of at least 30 carbon atoms. Ar is an aromatic moiety which can include linked polynuclear aromatic moieties represented by the general formula ar—(—Lng—ar—)—$_w(Q)_{mw}$ wherein w is an integer of 1 to about 20. Each Lng is a bridging linkage of the type including alkylene linkages (e.g., —$CH_2$— among others).

SUMMARY OF THE INVENTION

The present invention provides a method for reducing the pour point of a wax-containing (e.g., paraffin-containing) liquid, comprising adding to said liquid a pour-point reducing amount of a hydrocarbyl-substituted phenol having a number average of at least 30 carbon atoms (preferably greater than 30 carbon atoms) in the hydrocarbyl-substituent, and an aldehyde of 1 to about 12 carbon atoms, or a source therefor. The invention further encompasses a wax-containing liquid composition comprising a wax-containing liquid, where the liquid exhibits a pour point (prior to treatment) of at least 4° C. (40° F.) and a pour-point reducing amount of the above pour point depressant.

Finally, the present invention comprises a method for preparing the reaction product of (a) a hydrocarbyl-substituted phenol and (b) an aldehyde of 1 to 12 carbon atoms. The method is particularly suitable when the hydrocarbyl group contains at least 30 carbon atoms, but can also be employed with shorter groups, e.g., alkyl groups of 24–28 carbon atoms.

DETAILED DESCRIPTION OF THE INVENTION

The first aspect of the present invention relates to a pour point depressant comprising the reaction product of (a) a hydrocarbyl-substituted phenol having a number average of at least 30 carbon atoms in the hydrocarbyl-substituent, and (b) an aldehyde of 1 to 12, preferably 1 to 4, carbon atoms, or a source therefor.

Hydrocarbyl-substituted phenols are known materials, as is their method of preparation. When the term "phenol" is used herein, it is to be understood that this term is not generally intended to limit the aromatic group of the phenol to benzene (unless the context so indicates, for instance, in the Examples), although benzene may be the preferred aromatic group. Rather, the term is to be understood in its broader sense to include hydroxy aromatic compounds in general, for example, substituted phenols, hydroxy naphthalenes, and the like. Thus, the aromatic group of a "phenol" can be mononuclear or polynuclear, substituted, and can include other types of aromatic groups as well.

The aromatic group of the hydroxyaromatic compound can thus be a single aromatic nucleus such as a benzene nucleus, a pyridine nucleus, a thiophene nucleus, a 1,2,3,4-tetrahydronaphthalene nucleus, etc., or a polynuclear aromatic moiety. Such polynuclear moieties can be of the fused type; that is, wherein pairs of aromatic nuclei making up the aromatic group share two points, such as found in naphthalene, anthracene, the azanaphthalenes, etc. Polynuclear aromatic moieties also can be of the linked type wherein at least two nuclei (either mono or polynuclear) are linked through bridging linkages to each other. Such bridging linkages can be chosen from the group consisting of carbon-to-carbon single bonds between aromatic nuclei, ether linkages, keto linkages, sulfide linkages, polysulfide linkages of 2 to 6 sulfur atoms, sulfinyl linkages, sulfonyl linkages, methylene linkages, alkylene linkages, di-(lower alkyl) methylene linkages, lower alkylene ether linkages, alkylene keto linkages, lower alkylene sulfur linkages, lower alkylene polysulfide linkages of 2 to 6 carbon atoms, amino linkages, polyamino linkages and mixtures of such divalent bridging linkages. In certain instances, more than one bridging linkage can be present in the aromatic group between aromatic nuclei. For example, a fluorene nucleus has two benzene nuclei linked by both a methylene linkage and a covalent bond. Such a nucleus may be considered to have 3 nuclei but only two of them are aromatic. Normally, the aromatic group will contain only carbon atoms in the aromatic nuclei per se, although other non-aromatic substitution, such as in particular short chain alkyl substitution can also be present. Thus methyl, ethyl, propyl, and t-butyl groups, for instance, can be present on the aromatic groups, even though such groups may not be explicitly represented in structures set forth herein.

Specific examples of single ring aromatic moieties are the following:

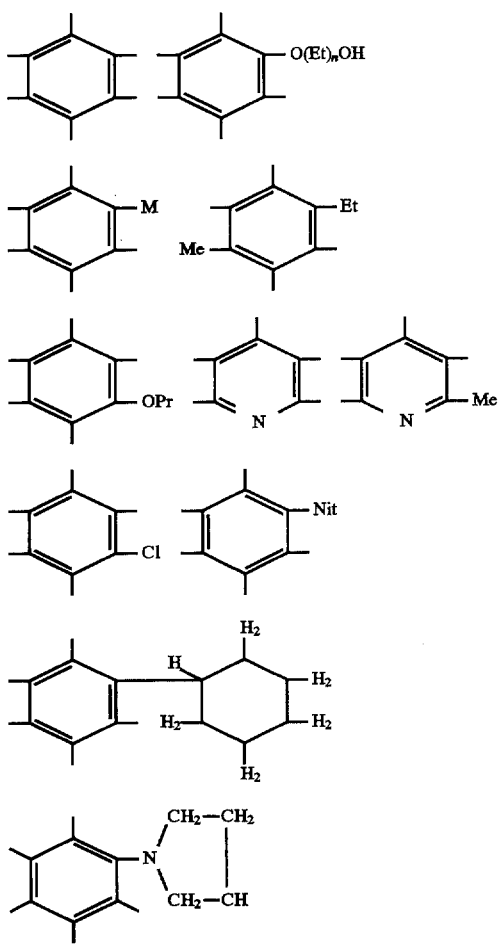

etc., wherein Me is methyl, Et is ethyl or ethylene, as appropriate, and Pr is n-propyl.

Specific examples of fused ring aromatic moieties are:

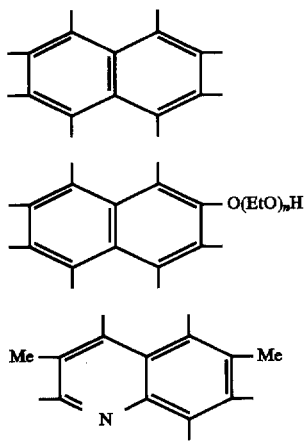

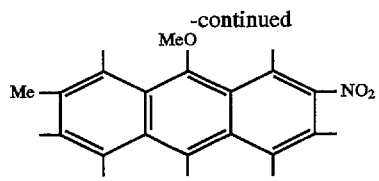

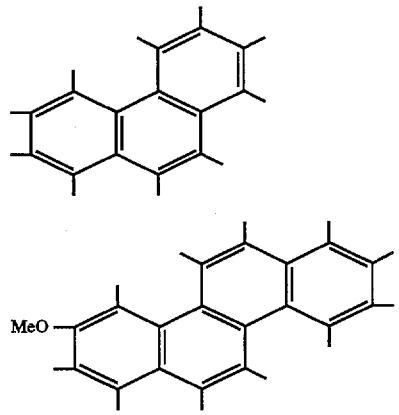

etc.

When the aromatic moiety is a linked polynuclear aromatic moiety, it can be represented by the general formula ar(—L—ar—)$_w$ wherein w is an integer of 1 to about 20, each ar is a single ring or a fused ring aromatic nucleus of 4 to about 12 carbon atoms and each L is independently selected from the group consisting of carbon-to-carbon single bonds between ar nuclei, ether linkages (e.g. —O—), keto linkages (e.g., —C(=O)—), sulfide linkages (e.g., —S—), polysulfide linkages of 2 to 6 sulfur atoms (e.g., —S$_{2-6}$), sulfinyl linkages (e.g., —S(O)—), sulfonyl linkages (e.g., —S(O)$_2$—), lower alkylene linkages (e.g., —CH$_2$—, —CH$_2$—CH$_2$—, —CH$_2$—CHR$^o$—), mono(lower alkyl)-methylene linkages (e.g., —CHR$^o$—), di(lower alkyl)-methylene linkages (e.g., —CR$^o{}_2$—), lower alkylene ether linkages (e.g., —CH$_2$O—, —CH$_2$O—CH$_2$—, —CH$_2$—CH$_2$O—, —CH$_2$CH$_2$OCH$_2$CH—$_2$, —CH$_2$CHOCH$_2$CH—,
  R$^o$   R$^o$ —CHR$^o$—O—, —CHR$^o$—O—CHR$^o$—, —CH$_2$CHOCHCH$_2$—,
  R$^o$  R$^o$ etc.), lower alkylene sulfide linkages (e.g., wherein one or more —O—'s in the lower alkylene ether linkages is replaced with a S atom), lower alkylene polysulfide linkages (e.g., wherein one or more —O— is replaced with a —S$_{2-6}$ group), amino linkages (e.g., —N—, —N—, —CH$_2$N—,
 H    R$^o$ —CH$_2$NCH$_2$—, —alk-N—, where alk is lower alkylene, etc.), polyamino linkages (e.g., —N(alkN)$_{1-10}$, where the unsatisfied free N valences are taken up with H atoms or R$^o$ groups), linkages derived from oxo- or keto- carboxylic acids (e.g.)

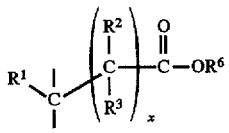

wherein each of $R^1$, $R^2$ and $R^3$ is independently hydrocarbyl, preferably alkyl or alkenyl, most preferably lower alkyl, or H, $R^6$ is H or an alkyl group and x is an integer ranging from 0 to about 8, and mixtures of such bridging linkages (each $R^o$ being a lower alkyl group).

Specific examples of linked moieties are:

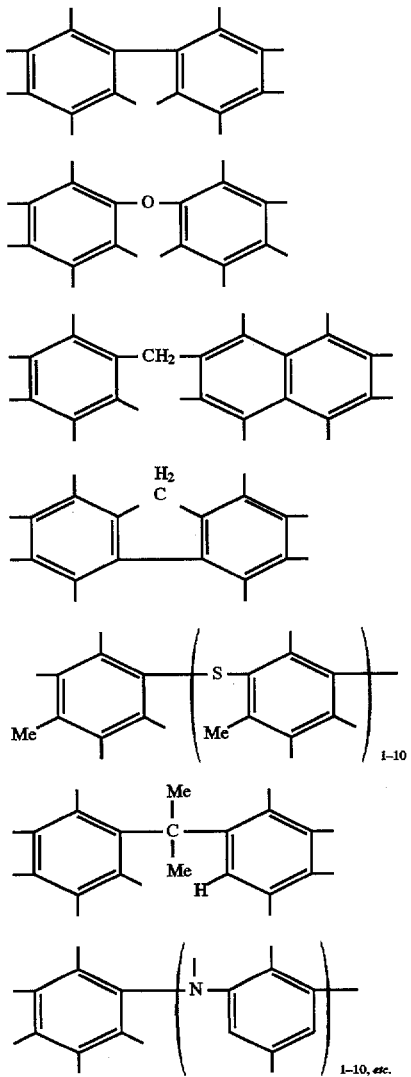

Usually all of these aromatic groups have no substituents except for those specifically named. For such reasons as cost, availability, performance, etc., the aromatic group is normally a benzene nucleus, a lower alkylene bridged benzene nucleus, or a naphthalene nucleus. Most preferably the aromatic group is a single benzene nucleus.

This first reactant is a hydroxyaromatic compound, that is, a compound in which at least one hydroxy group is directly attached to an aromatic ring. The number of hydroxy groups per aromatic group will vary from 1 up to the maximum number of such groups that the hydrocarbyl-substituted aromatic moiety can accommodate while still retaining at least one, and preferably at least two, positions, at least some of which are preferably adjacent (ortho) to a hydroxy group, which are suitable for further reaction by condensation with aldehydes (described in detail below). Thus most of the molecules of the reactant will have at least two unsubstituted positions. Suitable materials can include, then, hydrocarbyl-substituted catechols, resorcinols, hydroquinones, and even pyrogallols and phloroglucinols. Most commonly each aromatic nucleus, however, will bear one hydroxyl group and, in the preferred case when a hydrocarbyl substituted phenol is employed, the material will contain one benzene nucleus and one hydroxyl group. Of course, a small fraction of the aromatic reactant molecules may contain zero hydroxyl substituents. For instance, a minor amount of non-hydroxy materials may be present as an impurity. However, this does not defeat the spirit of the inventions, so long as the starting material is functional and contains, typically, at least one hydroxyl group per molecule.

The hydroxyaromatic reactant is similarly characterized in that it is hydrocarbyl substituted. The term "hydrocarbyl substituent" or "hydrocarbyl group" is used herein in its ordinary sense, which is well-known to those skilled in the art. Specifically, it refers to a group having a carbon atom directly attached to the remainder of the molecule and having predominantly hydrocarbon character. Examples of hydrocarbyl groups include:

(1) hydrocarbon substituents, that is, aliphatic (e.g., alkyl or alkenyl), alicyclic (e.g., cycloalkyl, cycloalkenyl) substituents, and aromatic-, aliphatic-, and alicyclic-substituted aromatic substituents, as well as cyclic substituents wherein the ring is completed through another portion of the molecule (e.g., two substituents together form an alicyclic radical);

(2) substituted hydrocarbon substituents, that is, substituents containing non-hydrocarbon groups which, in the context of this invention, do not alter the predominantly hydrocarbon substituent (e.g., halo (especially chloro and fluoro), hydroxy, alkoxy, mercapto, alkylmercapto, nitro, nitroso, and sulfoxy);

(3) hetero substituents, that is, substituents which, while having a predominantly hydrocarbon character, in the context of this invention, contain other than carbon in a ring or chain otherwise composed of carbon atoms. Heteroatoms include sulfur, oxygen, nitrogen, and encompass substituents as pyridyl, furyl, thienyl and imidazolyl. In general, no more than two, preferably no more than one, non-hydrocarbon substituent will be present for every ten carbon atoms in the hydrocarbyl group; typically, there will be no non-hydrocarbon substituents in the hydrocarbyl group.

Preferably the hydrocarbyl group is an alkyl group. Typically the alkyl group will contain at least 30 carbon atoms, or if the alkyl group is a mixture of alkyl groups, the mixture will contain on average at least 30 carbon atoms, typically 31 to 400 carbon atoms, preferably 31 to 60, and more preferably 32 to 50 or 45 carbon atoms. In a preferred embodiment, the alkyl group in the composition will be a mixture of alkyl groups, which may vary in length from one particular molecule to another. While a fraction of the molecules may contain an alkyl group of fewer than 30 carbon atoms, the composition as a whole will normally be characterized as having alkyl substitution of at least 30 carbon atoms in length. However, for certain embodiments of the present invention the alkyl group can be shorter, containing fewer than 30 carbon atoms, e.g., predominantly 24 to 28 carbon atoms. The alkyl groups, in any case, can be derived from either linear or branched olefin reactants; linear are sometimes preferred, although the longer chain length materials tend to have increasing proportions of branching. A certain amount of branching appears to be introduced via a rearrangement mechanism during the alkylation process as well.

In a preferred embodiment, the hydrocarbyl groups employed comprise a mixture of alkyl lengths of predominantly 30 to 36 carbon atoms, having a number average carbon number of about 34.4 and a weight average carbon number of about 35.4 This material is characterized as having approximately the following chain length distribution:

| | | | |
|---|---|---|---|
| $C_{26}$ | 0.3% | $C_{40}$ | 3.8 |
| $C_{28}$ | 11.9 | $C_{42}$ | 2.9 |
| $C_{30}$ | 16.7 | $C_{44}$ | 2.3 |
| $C_{32}$ | 11.3 | $C_{46}$ | 1.8 |
| $C_{34}$ | 8.6 | $C_{48}$ | 1.5 |
| $C_{36}$ | 6.6 | $C_{50}$ | 1.4 |
| $C_{38}$ | 5.0 | $C_{52}$ | 1.3 |

The hydrocarbyl substituent thus contains a number average number of greater than 30 carbon atoms. Such substituents are preferably alkyl groups wherein the number average number of carbon atoms in the alkyl chain is 31–40, more preferably 32–38.

The hydrocarbyl group can be derived from the corresponding olefin; for example, a $C_{26}$ alkyl group is derived from a $C_{26}$ alkene, preferably a 1-alkene, a $C_{34}$ alkyl group is derived from a $C_{34}$ alkene, and mixed length groups are derived from the corresponding mixture of olefins. When the hydrocarbyl group is a hydrocarbyl group having at least about 30 carbon atoms, however, it is frequently an aliphatic group (or a mixture of such groups) made from homo- or interpolymers (e.g., copolymers, terpolymers) of mono- and di-olefins having 2 to 10 carbon atoms, such as ethylene, propylene, butone-1, isobutene, butadiene, isoprene, 1-hexene, 1-octene, etc. For suitable use as a pour point depressant, at least a portion of the alkyl group or groups is preferably straight chain, that is, substantially linear. It is believed that this feature is preferred in order to permit the chain to more favorably interact with the chain structure of wax-forming hydrocarbons. It is recognized that in many cases there will be a methyl branch at the point of attachment of the alkyl chain to the aromatic ring, even when an α-olefin is employed. This is considered to be within the scope of the meaning of straight chain or linear alkyl groups. Likewise, in some cases a fraction of the alkyl groups may contain lower alkyl branching at the point of attachment (or α position), possibly due to migration of the active site during the alkylation reaction. Typically, the olefins employed are 1-mono olefins such as homopolymers of ethylene. These aliphatic hydrocarbyl groups can also be derived from halogenated (e.g., chlorinated or brominated) analogs of such homo- or interpolymers. Such groups can, however, be derived from other sources, such as monomeric high molecular weight alkenes (e.g., 1-tetracontene) and chlorinated analogs and hydrochlorinated analogs thereof, aliphatic petroleum fractions, particularly paraffin waxes and cracked and chlorinated analogs and hydrochlorinated analogs thereof, white oils, synthetic alkenes such as those produced by the Ziegler-Natta process (e.g., poly(ethylene) greases) and other sources known to those skilled in the art. Any unsaturation in the hydrocaxbyl groups may be reduced or eliminated by hydrogenation according to procedures known in the art. Preparation by routes or using materials which are substantially free from chlorine or other halogens is sometimes preferred for environmental reasons.

In one embodiment, a portion of the hydrocarbyl groups are derived from polybutene. In another embodiment, a portion of the hydrocarbyl groups are derived from polypropylene. In a preferred embodiment, the hydrocarbyl group is derived from a mixture of substantially unbranched olefins, having chain lengths predominantly of 30–36 carbon atoms, as described above.

More than one such hydrocarbyl group can be present, but usually no more than 2 or 3 are present for each aromatic nucleus in the aromatic group. Most typically only 1 hydrocarbyl group is present per aromatic moiety, particularly where the hydrocarbyl-substituted phenol is based on a single benzene ring.

The attachment of a hydrocarbyl group to the aromatic moiety of the first reactant of this invention can be accomplished by a number of techniques well known to those skilled in the art. One particularly suitable technique is the Friedel-Crafts reaction, wherein an olefin (e.g., a polymer containing an olefinic bond), or halogenated or hydrohalogenated analog thereof, is reacted with a phenol in the presence of a Lewis acid catalyst. Methods and conditions for carrying out such reactions are well known to those skilled in the art. See, for example, the discussion in the article entitled, "Alkylation of Phenols" in "Kirk-Othmer Encyclopedia of Chemical Technology", Third Edition, Vol. 2, pages 65–66, Interscience Publishers, a division of John Wiley and Company, N.Y. Other equally appropriate and convenient techniques for attaching the hydrocarcon-based group to the aromatic moiety will occur readily to those skilled in the art.

EXAMPLE 1

A 12-L, four-neck, round-bottom flask, equipped with thermocouple, nitrogen purging tube (14 L/hr (0.5 std. ft$^3$/hr) N$_2$), mechanical stirrer, Dean-Stark trap, and Friedrich's condenser, is charged with 1901 g (20.2 equivalents) distilled (95%) phenol. The phenol is heated with stirring to 100° C. and 62.4 g Amberlyst 15™ catalyst (from Rohm and Haas) is charged. The mixture is further heated to 150° C. and maintained for 1.5 hours, collecting 9.5 mL of a colorless condensate in the trap. The mixture is maintained at 150° C. while 2150 g of a $C_{30+}$ α-olefin mixture from Chevron is charged over a 1.3 hr. period; thereafter the mixture is maintained at 150° C. for an additional 5 hours. The mixture is cooled to 120° C. and filtered through a glass microfibrous filter pad to remove catalyst. The filtrate is stripped at 160° C. at 1.5 kPa (11 mm Hg) pressure. The resulting material is again filtered through a micro fibrous glass filter pad at 120° C. to give the product in the form of a liquid which solidifies into a waxy solid.

EXAMPLE 2

Into the apparatus described in Example 1 is charged 2140 g (22.8 equivalents) of distilled phenol. Nitrogen is purged at 31 L/hr (1.1 std. ft$^3$/hr). Upon heating to 100° C., 61.4 g Amberlyst 15™ catalyst is charged, and 14 mL colorless condensate is collected. The mixture is maintained at 150° C. while 2240 g of $C_{24-28}$ α-olefins from Chevron are charged over a 1.5 hour period; thereafter the mixture is maintained at 150° C. for an additional 3 hours. The mixture is cooled to 120° C. and filtered through a glass microfibrous filter pad to remove catalyst. The filtrate is stripped at 150° C. at 2.4 kPa (18 mm Hg) for 0.5 hr. The resulting material is again filtered through a microfibrous glass filter pad at 110° C. to give the product in the form of a light yellow oil which solidifies into a white wax.

The second component which reacts to form the pour point depressant is an aldehyde of 1 to 12 carbon atoms, or a source therefor. Suitable aldehydes have the general formula RC(O)H, where R is preferably hydrogen or a hydrocarbyl group, as described above, although R can include other functional groups which do not interfere with the condensation reaction (described below) of the aldehyde with the hydroxyaromatic compound. This aldehyde preferably contains 1 to 12 carbon atoms, more preferably 1 to 4 carbon atoms, and still more preferably 1 or 2 carbon atoms. Such aldehydes include formaldehyde, acetaldehyde, propionaldehyde, butyraldehyde, isobutyraldehyde, pentanaldehyde, caproaldehyde, benzaldehyde, and higher aldehydes. Monoaldehydes are preferred. The most preferred aldehyde is formaldehyde, which can be supplied as a solution, but is more commonly used in the polymeric form, as paraformaldehyde. Paraformaldehyde may be considered a reactive equivalent of, or a source for, an aldehyde. Other reactive equivalents may include hydrates or cyclic trimers of aldehydes.

The hydrocarbyl phenol and the aldehyde are generally reacted in relative amounts ranging from molar ratios of phenol:aldehyde of 2:1 to 1:1.5. Preferably approximately equal molar amounts will be employed up to a 30% molar excess of the aldehyde (calculated based on aldehyde monomer). Preferably the amount of the aldehyde is 5 to 20, more preferably 8 to 15, percent greater than the hydrocarbyl phenol on a molar basis. The components are reacted under conditions to lead to oligomer or polymer formation. The molecular weight of the product will depend on features including the equivalent ratios of the reactants, the temperature and time of the reaction, and the impurities present. The product can have from 2 to 100 aromatic units (i.e., the substituted aromatic phenol monomeric units) present ("repeating") in its chain, preferably 3 to 70 such units, more preferably 4 to 50, 30, or 14 units. When the hydrocarbyl phenol is specifically an alkyl phenol having 24–28 carbon atoms in the alkyl chain, and when the aldehyde is formaldehyde, the material will preferably have a number average molecular weight of 1,000 to 24,000, more preferably 2,000 to 18,000, still more preferably 3,000 to 6,000. The molecular weights of materials based on a hydrocarbyl substituent length of about 34 carbon atoms would be proportionally somewhat higher.

The hydrocarbyl phenol and the aldehyde are reacted by mixing the alkylphenol and the aldehyde in an appropriate amount of diluent oil optionally, another solvent such as an aromatic solvent, e.g., xylene, in the presence of an acid such as sulfuric acid, a sulfonic acid such as an alkylphenylsulfonic acid, para-toluene sulfonic acid, or methane sulfonic acid, an organic acid such as glyoxylic acid, or Amberlyst™ catalyst, a solid, macroporous, lightly crosslinked sulfonated polystyrene-divinylbenzene resin catalyst from Rohm and Haas. The mixture is heated, generally to 90° to 160° C., preferably 100° to 150° or to 120° C., for a suitable time, such as 30 minutes to 6 hours, preferably 1 to 4, hours, to remove water of condensation. The time and temperature are correlated so that reaction at a lower temperature will generally require a longer time, and so on. Determining the exact conditions is within the ability of the person skilled in the art. If desired, the reaction mixture can thereafter be heated to a higher temperature, e.g., 140°–180° C., preferably 145°–155° C., to further drive off volatiles and move the reaction to completion. The product can be treated with base such as NaOH if desired, in order to neutralize the strong acid catalyst and to prepare a sodium salt of the product, if desired, and is thereafter isolated by conventional techniques such as filtration, as appropriate.

The product of this reaction can be generally regarded as comprising polymers or oligomers having the following repeating structure:

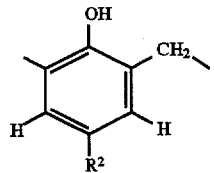

and positional isomers thereof.

However, a portion of the formaldehyde which is preferably employed is believed to be incorporated into the molecular structure in the form of substituent groups and linking groups such as those illustrated by the following types, including ether linkages and hydroxymethyl groups:

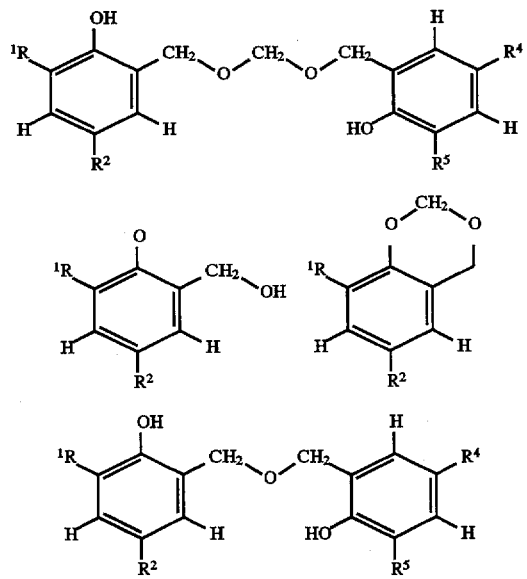

Preparation of the pour point depressants by the above method provides a material which generally exhibits improved handling properties such as increased flash point, compared with pour point depressants prepared by prior art methods.

EXAMPLE 3

A 5-L flask assembly similar to that of Example 1 is charged with 1850 g of the $C_{30+}$ alkyl phenol from Example 1. The material is heated with stirring to 100° C. and 11.2 g concentrated sulfuric acid is added over a 10 minute period, immediately followed by a 9.6 g charge of paraformaldehyde (91%). Eleven additional charges of paraformaldehyde are added over the next 3 hours, for a total of 115 g, during which time condensate is collected in the trap. After the 3 hour period, one drop of antifoam agent is added and the temperature is increased to 115° C. over 0.5 hour, maintained at this temperature for 2 hours, followed by heating to 150° C. over 0.3 hours and maintaining at this temperature for 2.0 hours. 631 g of a commercial paraffinic high boiling solvent is added, reducing the temperature to 131° C. To the mixture is added 18.4 g of 50 weight % aqueous sodium hydroxide over a 10 minute period. The mixture is heated to 150° C. for 0.5 hour and an additional 992 g of paraffinic solvent is added, as well as 95 g of a filter aid. After an additional 1 hour at temperature, the mixture is filtered at 75° C. using additional filter aid, and the filter aid washed with an additional 292 g paraffinic solvent. The product is the filtrate, which contains about 50% paraffinic high boiling diluent.

EXAMPLE 4

A 1-L, four-neck, round-bottom flask equipped with a nitrogen purging line, stirrer, thermowell, Dean-Stark trap, and Friedrich's condenser, is charged with 360.2 g (0.787 equivalents) of predominantly $C_{24-28}$ alkyl-substituted phenol. The charge is heated with stirring, under nitrogen flow of 14 L/hr (0.5 std. ft$^3$/hr), to 70° C., and 75 g commercial aromatic solvent diluent (initial boiling point 179° C.) is added. The mixture is heated to 100° C., and, over a 2.8 hour period, 28.89 g paraformaldehyde (91%; 0.875 equivalents) are added in 12 equal portions. After addition of the first portion, 2.06 g of concentrated sulfuric acid is added, as well as 1 drop of a kerosene solution of a silicone antifoam agent (Dow Corning™ 200 Fluid). After addition of the paraformaldehyde is complete, the mixture is heated to 115° C. over 0.25 hours and maintained at this temperature for 1.7 hours, thereafter heated to 150° C. over 0.4 hours and maintained at that temperature for 1.5 hours, and thereafter heated to 156° C. for about 0.5 hours. Addition of 295 g additional diluent aromatic solvent causes the temperature to drop to 122° C. Sodium hydroxide, 3.8 g of 50% solution, is added, as well as 19.7 g of a filter aid (FAX-5™). The mixture is again heated to 150° C. After 0.8 hours at 150° C., the mixture is cooled to less than 50° C. and is filtered to provide 728.2 g of a brown oil filtrate, which is the product, containing about 50% diluent.

EXAMPLE 5

The procedure of Example 4 is substantially repeated, except that a 5 L flask is used. The flask is charged with 1870 g of the $C_{24-28}$-alkyl phenol/formaldehyde condensate and 389 g o-xylene. Concentrated sulfuric acid, 11.3 g, is added at 80° C. over a 10 minute period. Paraformaldehyde, 150 g, 91%, is charged in 12 portions at 80°–100° C. over 3 hours, and water of condensation is collected. Two drops of antifoam agent are added and the mixture heated to 115° C. for 2 hours, then to 150° C. over 1 hour and maintained at that temperature for 2 additional hours. Then 642 g of a commercial paraffinic high boiling solvent is added, reducing the temperature to 131° C. To the mixture is added 17.9 g of 50 weight % aqueous sodium hydroxide dropwise over a 10 minute period. The mixture is heated to 150° C. for 0.5 hour, then brought to 130° C. at 8.6 kPa (65 mm Hg) for 1 hour. An additional 1283 g of commercial paraffinic high boiling solvent is added, as well as 95 g of a filter aid. After 1 hour of additional stirring, the mixture is filtered through 25 g additional filter aid at 110° C.

EXAMPLE 6

A 1-L, four-neck, round bottom flask equipped as in Example 4 is charged with 360 g of $C_{24-28}$-alkyl phenol and heated with stirring and under nitrogen (17–28 L/hr (0.6–1.0 std. ft$^3$/hr)) to 83° C. Concentrated sulfuric acid, 2.2 g, is added and the mixture is heated to 101° C. Paraformaldehyde, 29.11 g (91%), is added in 16 portions over a three hour period, and condensate is collected. The mixture is heated to 115° C. over 0.4 hours and maintained for 1.75 hours, then heated to 150° C. over 0.4 hours and maintained for 1.75 hours. The mixture is allowed to cool to 125° C., and 4.09 g of 50% sodium hydroxide is added. The mixture is heated to and held at 150° C. for 1.0 hour. Then 371 g of commercial paraffinic high boiling solvent is added as well as 22 g filter aid. The mixture is cooled somewhat and filtered using additional filter aid over a period of 3 hours. The filtrate is the product.

EXAMPLE 7

To a 760-L glass-jacketed reaction vessel equipped with a stirrer, a column, a condenser, a distillate receiver, and a nitrogen purge (570 L/hr (20 std. ft$^3$/hr) is charged 155 kg $C_{24-28}$-alkyl phenol and 31 kg commercial aromatic solvent diluent. The mixture is heated, with stirring, to 79°–85° C., whereupon 890 g concentrated sulfuric acid is added. The mixture is heated to 104°–110° C. and 12.2 kg paraformaldehyde (91%) is added in 9 equal increments over hours, removing aqueous distillate as it is generated. The mixture is heated to 118°–124° C. over three hours and maintained at temperature for an additional 2 hours, then to 127° C. while simultaneously adding 1.35 kg 50% aqueous sodium hydroxide. The mixture is heated to 149°–154° C. over two hours (with increased nitrogen flow) to remove residual water. The mixture is cooled to 60° C., and 126 kg additional commercial aromatic solvent diluent is added, to provide 50% diluent. The mixture is filtered at 60°–66° C. employing 2.7 kg filter aid.

EXAMPLE 8

The procedure of Example 7 is substantially repeated using in place of the $C_{24-28}$-alkyl phenol a molar equivalent amount of $C_{30+}$-alkyl phenol. For this example, no solvent is employed in the initial stage of the reaction, but the amount added after the reaction is the amount calculated to provide 50% polymer, 50% solvent. In an alternative embodiment of this Example, solvent is employed as in Example 7.

The pour point depressant materials of this invention which have an average alkyl chain length of at least 30 carbon atoms, are particularly suitable for reducing the pour point of certain petroleum oils, i.e., crude oils or fractions of crude oil, such as residual oil, vacuum gas oil, or vacuum residual oils (Bunker C crude oils), that is, naturally sourced and partially refined oils, including partially processed petroleum derived oils. The suitable oils are generally those which have an initial (that is, unmodified, or prior to treatment with the pour point depressant) pour point of at least 4° C. (40° F.), preferably at least 10° C. (50° F.) or more preferably 16° C. (60° F.), although they also exhibit some advantage in certain oils which fall outside of these limits. The use of the present materials is particularly valuable in those crude oils which are difficult to treat by other means. For example, they are particularly useful in oils (crude oils and oil fractions such as those described above) which have a wax content of greater than 5%, preferably greater than 10%, by weight as measured by UOP-46-85 (procedure from UOP, Inc., "Paraffin wax content of petroleum oils and asphalts"). (Wax-containing materials are sometimes also referred to as paraffin-containing materials, paraffin being an approximate equivalent for wax, and in particular, for petroleum waxes. The present invention is not particularly limited to any specific type of wax which may cause the pour point phenomenon in a given liquid. Thus paraffin wax, microcrystalline waxes, and other waxes are encompassed. It is recognized that in many important materials, such as petroleum oils, paraffin wax may be particularly important.) The pour point depressant materials are further useful in oils with a large high-boiling fraction, that is, in which the fraction boiling between 271° C. (520° F.) and 538° C. (1000° F.) (i.e., about $C_{15}$ and above) comprises at least 25%, preferably at least 30%, more preferably at least 35% of the oil (exclusive of any fraction of 7 or fewer carbon atoms). Among high boiling oils, they are more particularly useful if greater than 10%, preferably greater than 20%, more preferably greater than 30%, of the high boiling (271°–538° C.) fraction boils between 399° C. (750° F.) and 538° C. (1000° F.) (i.e., about $C_{25}$ and above), as measured by ASTM D 5307-92. Preferably this highest boiling (399°–538° C.) fraction will comprise at least 10% of the total oil (exclusive of any fraction of 7 or fewer carbon atoms). Preferably the analysis is performed on stock tank crude which is degassed and contains little or no fraction of $C_4$ or below. They are further useful in materials which have an API gravity of greater than 20° (ASTM D-287-82).

The present pour point depressant material are, in many cases, useful for treating oils (e.g., crude oils and fractions thereof) which have a $N_w$ of greater than 18, preferably greater than 20, and more preferably greater than 22. Here $N_w$ is the weight average number of carbon atoms of the molecules of the oil, defined by $$N_w = \frac{\Sigma B_n * n^2}{\Sigma B_n * n}$$

where $B_n$ represents the weight percent of the crude boiling fraction of the oil containing the alkane $C_nH_{2n+2}$ and n is the carbon number of the corresponding paraffin. These boiling fraction values are determined by ASTM procedure D5307-92. Most preferably the suitable oils will have the above defined value of $N_w$, as well as one or more of the above-defined characteristics such as a pour point above 4° C. and/or a wax content of greater than 5% (UOP-41-85 procedure).

The amount of the pour point depressant employed in the oil or in the other wax-containing liquid, will be an amount suitable to reduce the pour point thereof by a measurable amount, i.e., by at least 0.6° C. (1° F.), preferably at least 2° C. (3° or 4° F.), more preferably 3° C. (5° F.), and even more preferably 6° C. (10° F.). This reduction in pour point can be readily determined by one skilled in the art by employing the methodology of ASTM D- 97. Typically the amount of pour point employed will be 50 to 10,000 parts per million by weight (ppm), preferably 100 to 5000 ppm, more preferably 200 to 2000 ppm, based on the fluid to which it is added.

EXAMPLES 9–16

The pour point depressant prepared as in Example 3 is supplied in the amounts indicated to various crude oils listed in the following Table, each of which has an untreated pour point of at least 4° C. The pour point depressant is added in the conventional manner, that is, by mixing into the crude oil at a temperature above the pour point of the oil, although other methods of addition will be apparent to those skilled in the art. The pour points are reduced as indicated.

| Ex.[c] | Crude Oil | PPD Treat, ppm | Pour Point, °C. |
|---|---|---|---|
| 9 | Phillips 66 ™ South Marsh Island #147, #10 F/L | 0 | 4[a] |
|  |  | 500 | 2 |
| 10 | Sarir ™ Libya Crude | 0 | 24[b] |
|  |  | 2000 | 11, 17[b] |
| 11 | Anadarko ™ Pet. Tucker #1 Oklahoma | 0 | 24 |
|  |  | 2000 | −7 |

-continued

| Ex.[c] | Crude Oil | PPD Treat, ppm | Pour Point, °C. |
|---|---|---|---|
| 12 | Lion Resources ™ South American | 0 | 13 |
|  |  | 500 | −4 |
| 13 | Control Services ™ South Marsh Island Gulf of Mexico | 0 | 29 |
|  |  | 1000 | 27, 27[b] |
|  |  | 2000 | 27, 24[b] |
| 14 | Aandarko ™ Pet. Tucker #3 | 0 | 24, 21[b] |
|  |  | 2000 | 2, 4[b] |
| 15 | Lion Resources ™ South American | 0 | 16 |
|  |  | 2000 | 4 |
| 16 | Mobil ™ heavy fuel oil, Egypt | 0 | 35 |
|  |  | 2000 | 26 |

[a]another specimen shows untreated pour point of −1° C., +1° C.
[b]duplicate runs
[c]one additional oil, normally exhibiting a pour point of 0° C., shows in one sample a pour point of 13° C., reduced to 10° C. by 500 ppm of the depressant FIG. 1 shows the composition of an Anadarko Tucker crude oil similar to that of Examples 11 and 14, presented as % Weight as a function of Boiling Fraction. The large peak for C40 in both cases represents the sum of components boiling in the C40 range and above.

In some of the above formulations the cloud point, as well as the pour point, is depressed.

The pour point depressants of the present invention can be supplied in the pure form (containing 0% diluent) or as concentrates containing a diluent such as a hydrocarbon oil. When supplied as a concentrate, the amount of oil can be up to 90% of the composition, typically 10–90%, preferably 30–70%, and more preferably 40–60%. Alternatively, the pour point depressants can be supplied as dispersions in such materials acetates (e.g., as 2-ethoxyethyl acetate) or aqueous glycol mixtures (e.g., mixtures of ethylene glycol and water).

Each of the documents referred to above is incorporated herein by reference. Except in the Examples, or where otherwise explicitly indicated, all numerical quantities in this description specifying mounts of materials, reaction conditions, molecular weights, number of carbon atoms, and the like, are to be understood as modified by the word "about." Unless otherwise indicated, each chemical or composition referred to herein should be interpreted as being a commercial grade material which may contain the isomers, by-products, derivatives, and other such materials which are normally understood to be present in the commercial grade. However, the amount of each chemical component is presented exclusive of any solvent or diluent oil which may be customarily present in the commercial material, unless otherwise indicated. As used herein, the expression "consisting essentially of" permits the inclusion of substances which do not materially affect the basic and novel characteristics of the composition under consideration.

What is claimed is:

1. A wax-containing liquid composition comprising:
   (a) a wax-containing liquid which exhibits an initial pour point of at least 4° C., and
   (b) an amount, sufficient to reduce the pour point of said wax-containing liquid, of a pour point depressant comprising the reaction product of (a) a hydrocarbyl-substituted phenol having a number average of at least 30 carbon atoms in the hydrocarbyl-substituent, and (b) an aldehyde of 1 to about 12 carbon atoms, or a source therefor.

2. The composition of claim 1 wherein the hydrocarbyl-substituted phenol is a hydrocarbyl-substituted hydroxybenzene.

3. The composition of claim 2 wherein the hydroxybenzene is a monohydroxybenzene.

4. The composition of claim 1 wherein the hydrocarbyl group is an alkyl group.

5. The composition of claim 4 wherein the alkyl group comprises a mixture of alkyl substituent having predominantly 30 to 36 carbon atoms.

6. The composition of claim 4 wherein the number average number of carbon atoms in the alkyl chain is 31–40.

7. The composition of claim 4 wherein at least a portion of the alkyl group is substantially linear.

8. The composition of claim 1 wherein the aldehyde contains 1 to 4 carbon atoms.

9. The composition of claim 1 wherein the aldehyde is formaldehyde or a source thereof.

10. The composition of claim 1 wherein the reaction product comprises the reaction of the hydrocarbyl phenol and the aldehyde or source therefor in a molar ratio of about 2:1 to about 1:1.5.

11. The composition of claim 1 wherein the reaction product comprises the reaction of the hydrocarbyl phenol with an amount of from equimolar up to about a 30% molar excess of the aldehyde or source therefor.

12. The composition of claim 1 wherein the reaction product comprises 2 to about 100 aromatic units.

13. The composition of claim 1 wherein the wax-containing liquid has an initial pour point of at least 10° C.

14. The composition of claim 1 wherein the wax-containing liquid is an oil which has a wax content of greater than 5%.

15. The composition of claim 1 wherein the wax-containing liquid is an oil in which the fraction boiling between 271° C. and 538° C. comprises at least 25% of the oil, exclusive of any fraction of 7 or fewer carbon atoms.

16. The composition of claim 1 wherein the wax-containing liquid is an oil in which greater than 10% of the fraction boiling between 271° C. and 538° C. boils between 399° C. and 538° C.

17. The composition of claim 1 wherein the wax-containing liquid is an oil which has a weight average number of carbon atoms of greater than 18, exclusive of any fraction of 7 or fewer carbon atoms.

18. The composition of claim 1 wherein the amount of the pour point depressant is an mount suitable to reduce the pour point of the wax-containing liquid by at least about 3° C.

19. The composition of claim 1 wherein the mount of the pour point depressant is about 50 to about 10,000 parts per million by weight based on the wax-containing liquid.

20. A method for reducing the pour point of a wax-containing liquid which exhibits an initial pour point of at least 4° C., comprising adding to said liquid a pour-point reducing mount of a pour point depressant comprising the reaction product of (a) a hydrocarbyl-substituted phenol having a number average of at least 30 carbon atoms in the hydrocarbyl-substituent, and (b) an aldehyde of 1 to about 12 carbon atoms, or a source therefor.

21. The method of claim 20 wherein the hydrocarbyl-substituted phenol is a hydrocarbyl-substituted hydroxybenzene.

22. The method of claim 21 wherein the hydroxybenzene is a monohydroxybenzene.

23. The method of claim 20 wherein the hydrocarbyl group is an alkyl group.

24. The method of claim 23 wherein the alkyl group is a mixture comprises a mixture of alkyl substituents having predominantly 30 to 36 carbon atoms.

25. The method of claim 23 wherein the number average number of carbon atoms in the alkyl chain is 31–40.

26. The method of claim 23 wherein at least a portion of the alkyl group substantially linear.

27. The method of claim 20 wherein the aldehyde contains 1 to 4 carbon atoms.

28. The method of claim 20 wherein the aldehyde is formaldehyde or a source thereof.

29. The method of claim 20 wherein the reaction product comprises the reaction of the hydrocarbyl phenol and the aldehyde or source thereof in a molar ratio of about 2:1 to about 1:1.5.

30. The method of claim 20 wherein the reaction product comprises the reaction of the hydrocarbyl phenol with an mount of from equimolar up to about a 30% molar excess of the aldehyde or source therefor.

31. The method of claim 20 wherein the reaction product comprises 2 to about 100 aromatic units.

32. The method of claim 20 wherein the wax-containing liquid has an initial pour point of at least 10° C.

33. The method of claim 20 wherein the wax-containing liquid is an oil which has a wax content of greater than 5%.

34. The method of claim 20 wherein the wax-containing liquid is an oil in which the fraction boiling between 271° C. and 538° C. comprises at least 25% of the oil, exclusive of any fraction of 7 or fewer carbon atoms.

35. The method of claim 20 wherein the wax-containing liquid is an oil in which greater than 10% of the fraction boiling between 271° C. and 538° C. boils between 399° C. and 538° C.

36. The method of claim 20 wherein the wax-containing liquid is an oil which has a weight average number of carbon atoms of greater than 18, exclusive of any fraction of 7 or fewer carbon atoms.

37. The method of claim 20 wherein the amount of the pour point depressant is an amount suitable to reduce the pour point of the wax-containing liquid by at least about 3° C.

38. The method of claim 20 wherein the amount of the pour point depressant is about 50 to about 10,000 parts per million by weight based on the wax-containing liquid.

39. The method of claim 20 wherein the pour point depressant is added to the wax-containing liquid, with mixing, at a temperature above the pour point of the wax-containing liquid.

* * * * *